United States Patent
Ye et al.

(10) Patent No.: US 8,031,655 B2
(45) Date of Patent: Oct. 4, 2011

(54) SYSTEMS AND METHODS FOR DETERMINING GRANULARITY LEVEL OF INFORMATION ABOUT BUFFER STATUS

(75) Inventors: Shiang-Rung Ye, Hsinchu (TW); Wern-Ho Sheen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 836 days.

(21) Appl. No.: 11/902,451

(22) Filed: Sep. 21, 2007

(65) Prior Publication Data

US 2008/0081628 A1     Apr. 3, 2008

Related U.S. Application Data

(60) Provisional application No. 60/848,641, filed on Oct. 3, 2006.

(51) Int. Cl.
*H04Q 7/00* (2006.01)
(52) U.S. Cl. ......... 370/328; 370/329
(58) Field of Classification Search .......... None
See application file for complete search history.

(56) References Cited

U.S. PATENT DOCUMENTS

2002/0114280 A1    8/2002  Yi et al.

OTHER PUBLICATIONS

R2-061915, "Comparison of UL buffer reporting/scheduling schemes in LTE", 3GPP TSG-RAN-WG2 LTE Ad Hoc Meeting, Cannes, France, Jun. 27-30, 2006.
3GPP TS 25.309, V6.6.0, "FDD Enhanced Uplink: Overall description; Stage 2", (Release 6), Mar. 2006.

*Primary Examiner* — Ayaz Sheikh
*Assistant Examiner* — Blanche Wong
(74) *Attorney, Agent, or Firm* — Finnegan, Henderson, Farabow, Garrett & Dunner, LLP (57) ABSTRACT

A method for controlling communication overhead from a user equipment to a base station. The base station determines a granularity level of an amount of information about a buffer status of a user equipment buffer. The base station makes the determination based on at least one variable parameter. The determined granularity level is sent to the user equipment, and received thereby. The buffer status is sent to the base station from the user equipment in accordance with the determined granularity level.

23 Claims, 8 Drawing Sheets

SYSTEMS AND METHODS FOR DETERMINING GRANULARITY LEVEL OF INFORMATION ABOUT BUFFER STATUS

RELATED APPLICATIONS

This application claims priority from U.S. Provisional Patent Application No. 60/848,641 filed Oct. 3, 2006, the contents of which are hereby incorporated by reference.

FIELD OF THE INVENTION

Systems and methods disclosed herein relate to the field of mobile communications and, more specifically, to systems for and methods of a base station determining a granularity level of information about buffer status received from user equipment in communication with the base station.

DESCRIPTION OF THE RELATED ART

Figure 1:
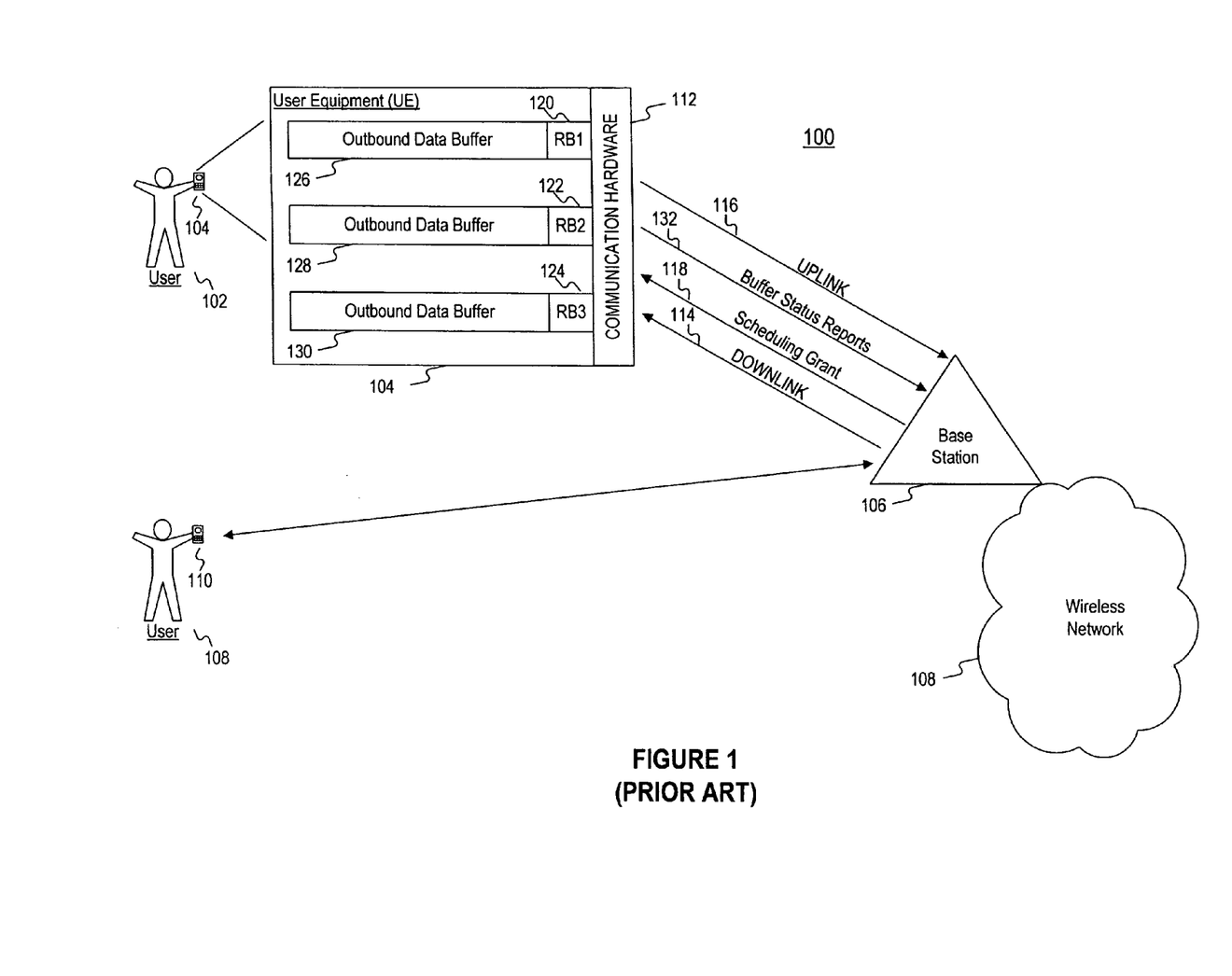
FIG. 1 is diagram of a conventional mobile system.

FIG. 1 illustrates a conventional mobile system 100. With reference to FIG. 1, in mobile system 100, an end user 102 employs user equipment (UE) 104 to access mobile services. UE 104 communicates first with a base station 106, which then provides connectivity for UE 104 with a wireless network 108. UE 104 may be a mobile station, which may, for example, be a mobile telephone, a mobile handheld device, or a wireless communication card in a laptop computer. Base station 106 may, for example, be a radio network controller (RNC) or an enhanced node B (eNB). A single base station 106 may communicate with multiple end users 102, 108 and multiple UEs 104, 110.

UE 104 includes communications hardware 112 for communicating with base station 106. Communication between base station 106 and UE 104 is bidirectional, any may include a downlink 114 from base station 106 to UE 104, and an uplink 116 from UE 104 to base station 106. In both forms of communication, there are bandwidth limitations as to the amount of data that may be transferred. Base station 106 may restrict the amount of uplink 116 bandwidth used by UE 104 by issuing a scheduling grant 118. UE 104 may only use uplink 116 bandwidth resources as permitted by base station 106 through issuance of the scheduling grant 118.

Therefore, base station 106 must decide whether or not to issue a scheduling grant 118 and, if one is issued, the amount of bandwidth that the scheduling grant 118 should permit UE 104 to use. To do so, base station 106 may rely upon the amount of available bandwidth that it can afford to allocate to UE 104, while also taking into consideration the amount of data that UE 104 needs to send. By balancing both considerations, base station 106 may determine an appropriate scheduling grant 118.

Communication from UE 104 to base station 106 for accessing mobile services may be accomplished through the use of at least one radio bearer (RB), e.g., RB1 120, RB2 122, and RB3 124, operating within UE 104. RBs 120, 122, 124 are logical connections, or communication ports, that provides a particular mobile service to UE 104. Furthermore, each active RB 120, 124, 126 may be classified as to the type of mobile service that it is providing, for example, RB1 120 may provide voice service, RB2 122 may provide streaming audio, RB3 124 may provide access to the world wide web, and so on. In addition, each RB 120, 122, 124 has an outbound data buffer 126, 128, 130, respectively, which holds data to be sent to base station 106 in furtherance of providing the particular mobile service to user 102.

UE 104 may communicate at least one buffer status report 132 of the RB outbound data buffers 126, 128, 130 to base station 106. The at least one buffer status report 132 describes the amount of data in outbound data buffers 126, 128, 130, which is related to the amount of uplink 116 bandwidth that UE 104 requires. Base station 106 may use the at least one buffer status report 132 in determining the nature of scheduling grant 118 issued to UE 104. That is, base station 106 may determine a bandwidth for uplink 116 of UE 104 in consideration of the at least one buffer status report and balance that information with the available bandwidth to determine scheduling grant 118.

If bandwidth is limited, UE 104 may decide not to send a buffer status report 132 for each RB 120, 122, 124, and instead may consolidate buffer status information for all or a group of the RBs 120, 122, 124 into a single buffer status report. This consolidation may lead to fewer buffer status reports 132 and less overhead. However, a disadvantage of sending fewer buffer status reports 132 is that it provides base station 106 with less information with which to make a decision regarding the scheduling grant 118. It is more useful for base station 106 to have a buffer status report 132 for each RB 120, 122, 124 than it is to have a single buffer report for all combined RBs 120, 122, 124 within UE 104. This is in part because base station 106 may issue scheduling grants 118 to certain RBs 120, 122, 124 or specific groups of RBs 120, 122, 124 in order to more finely control allocation of radio resources to groups.

In order to address this tradeoff, conventional systems provided predetermined schemes for determining the grouping of RB buffer status information into buffer status reports, i.e., a granularity level of the grouping. A first scheme provided for a single consolidated buffer status report, a second scheme provided for a buffer status report for each RB, and a third scheme provided for buffer status reports for groups of similar RBs. However, in these prior art systems, the schemes could not dynamically adjust to run time conditions, and were instead predetermined.

SUMMARY OF THE INVENTION

In accordance with the invention, there is provided a method for controlling communication overhead from user equipment to a base station, the user equipment including a buffer having a buffer status, the method comprising: determining, at the base station, a granularity level of an amount of information about the buffer status of the user equipment buffer, the base station making the determination based on at least one variable parameter; sending the determined granularity level to the user equipment; receiving, at the user equipment, the determined granularity level; and sending, from the user equipment to the base station, the buffer status in accordance with the determined granularity level.

Further in accordance with the present invention, there is provided a method for controlling communication overhead from at least one user equipment to a base station, the at least one user equipment including at least one radio bearer and at least one buffer, there being a buffer status for each of the at least one radio bearers of the at least one user equipment, the method comprising: grouping the radio bearers into a hierarchy of groups wherein each of the radio bearers is separate in a lowest level of the hierarchy and the radio bearers are grouped into at least two groups in a higher level of the hierarchy; determining, at the base station, a granularity level of an amount of information about the buffer statuses of the radio bearers, the granularity level being for the lowest level to thereby require the buffer status of each of the radio bearers or for the higher level to thereby require a summary of the buffer statuses of the radio bearers in each of the at least two groups Still further in accordance with the present invention, there is provided a mobile communication system for managing network traffic, the system comprising: a user equipment including a buffer having a buffer status; a base station for: determining a granularity level of an amount of information about the buffer status of the user equipment buffer, the base station making the determination based on at least one variable parameter; sending the determined granularity level to the user equipment; receiving, from the user equipment, the buffer status in accordance with the determined granularity level.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

Figure 2:
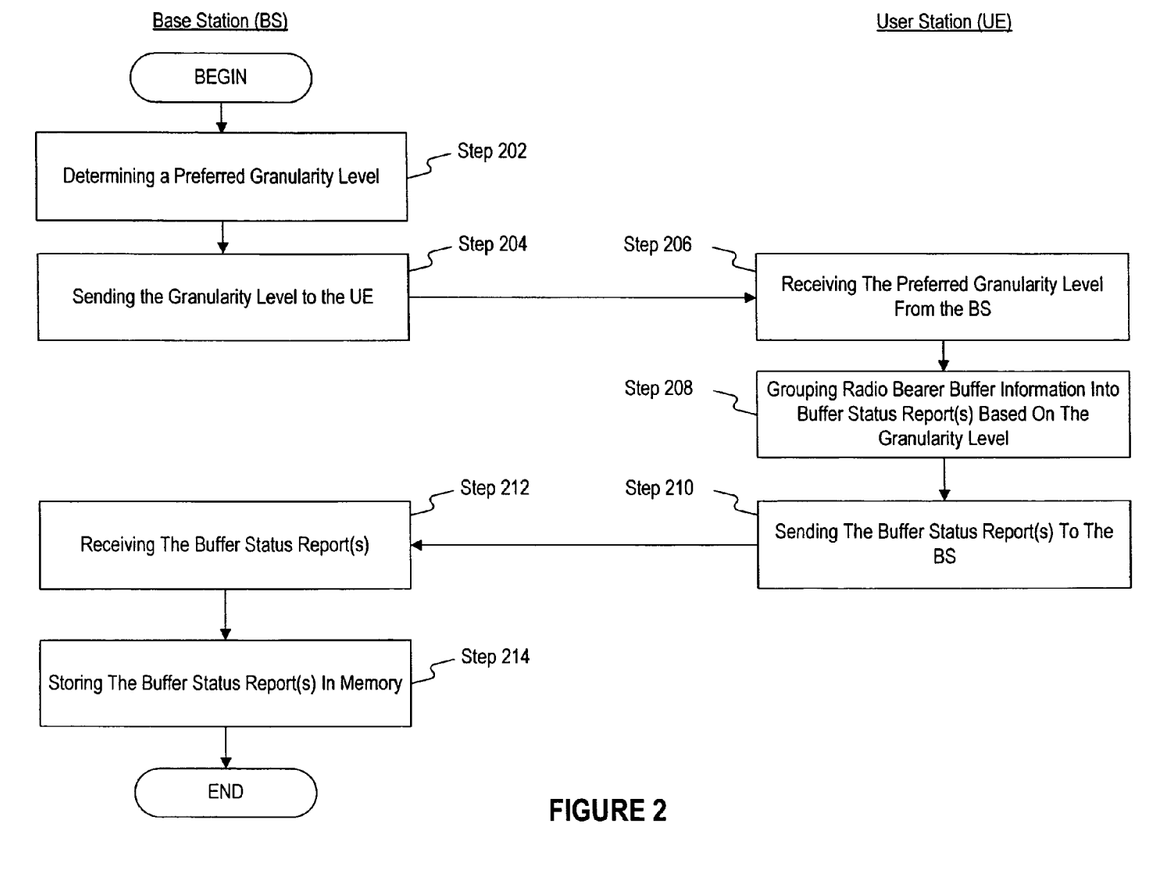
FIG. 2 is a flowchart of interaction between user equipment and a base station, for setting a granularity level consistent with embodiments of the present invention.

FIG. 2 is a flowchart of interaction between user equipment and a base station for setting a granularity level, consistent with embodiments of the present invention. The base station BS begins by determining a preferred granularity level based on one or more system conditions (Step 202). Details regarding the system conditions will be described later. The granularity level, as described previously, reflects a degree of consolidation of information regarding the status of buffers in user equipment UE into at least one buffer status report that the base station BS wishes to receive from the user equipment UE. Next, the base station BS sends the preferred granularity level to the user equipment UE (Step 204). The user equipment UE receives the preferred granularity level (Step 206) and prepares the at least one buffer status report consistent with the granularity level specified by the base station BS (Step 208). This preparation will be described in more detail later. Next the user equipment UE sends the at least one buffer status report to the base station BS (Step 210). The base station BS receives the at least one buffer status report (Step 212) and stores the at least one buffer status report into memory (Step 214), where it will be used in determining a scheduling grant. While FIG. 2 displays interaction between the single base station BS and single user equipment UE, the base station BS may be connected with a plurality of user equipments UEs.

Figure 3:
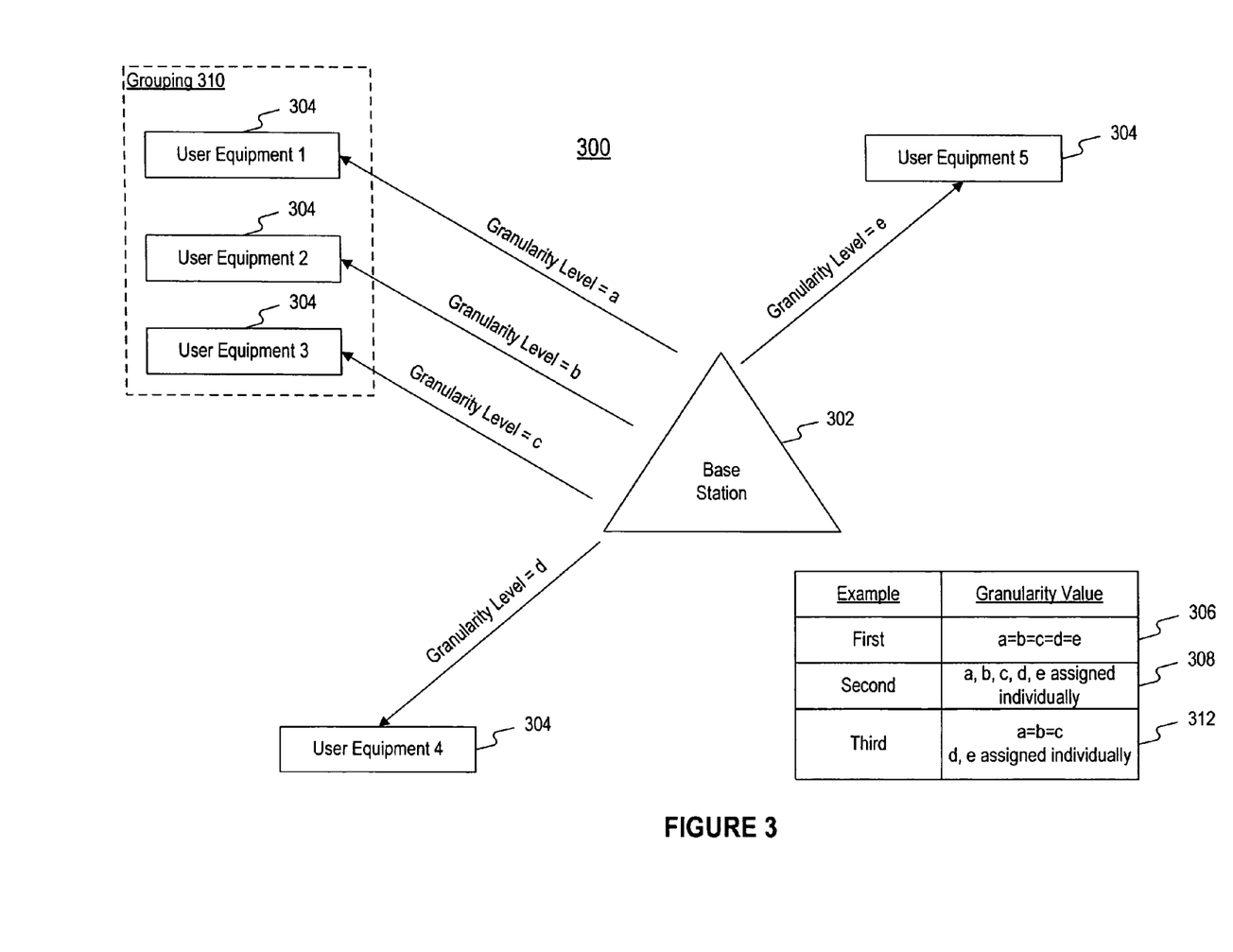
FIG. 3 is diagram of a mobile system in which a base station may assign a granularity level to a plurality of user equipment.

FIG. 3 is a diagram of a mobile system 300 in which a base station 302 may assign a granularity level to a plurality of user equipment. More particularly, FIG. 3 illustrates examples of different ways in which base station 302 may assign a granularity level to a plurality of UEs 304. As shown in FIG. 3, base station 302 of mobile system 300 communicates with five UEs 304 respectively referred to herein as UE1-UE5. As shown in FIG. 3, UE1-UE5 receive from base station 302 granularity levels a, b, c, d, and e, respectively.

In a first example, each of the plurality of UEs 304 shares the same granularity level, which is sent using broadcast or unicast by base station 302 to each of the plurality of UEs 304. An illustration of this first example is shown in table entry 306. In a second example, base station 302 may assign different granularity levels for different ones of the plurality of UEs 304. Specifically, base station 302 may determine the granularity level for each of the plurality of UEs 304 independently of one another. An illustration of this second example is shown in table entry 308. In a third example, base station 302 may assign different granularity levels for different groupings of the plurality of UEs 304. For example, UE1, UE2, and UE3 may be grouped together as a grouping 310 for which the same granularity level is assigned. One of ordinary skill in the art will now appreciate that any grouping criteria may be used. An illustration of this third example is shown in table entry 312.

A fourth example is a combination of the first, second, and third examples. In the fourth example, a particular one of the plurality of UEs 304 has assigned to it a specific granularity level, consistent with the second example, or a granularity level assigned to a group to which the particular UE 304 belongs, consistent with the third example. However, if no granularity level is assigned to the particular UE 304, then that UE 304 adopts the granularity level broadcasted by base station 302, consistent with the first example. In this way, the fourth example provides a scheme that uses aspects from any combination of the first, second, and third examples. One of ordinary skill in the art will now appreciate that these examples are exemplary in nature only and that there are other possible granularity assignment schemes that are consistent with the spirit and scope of the present invention.

Figure 4A:
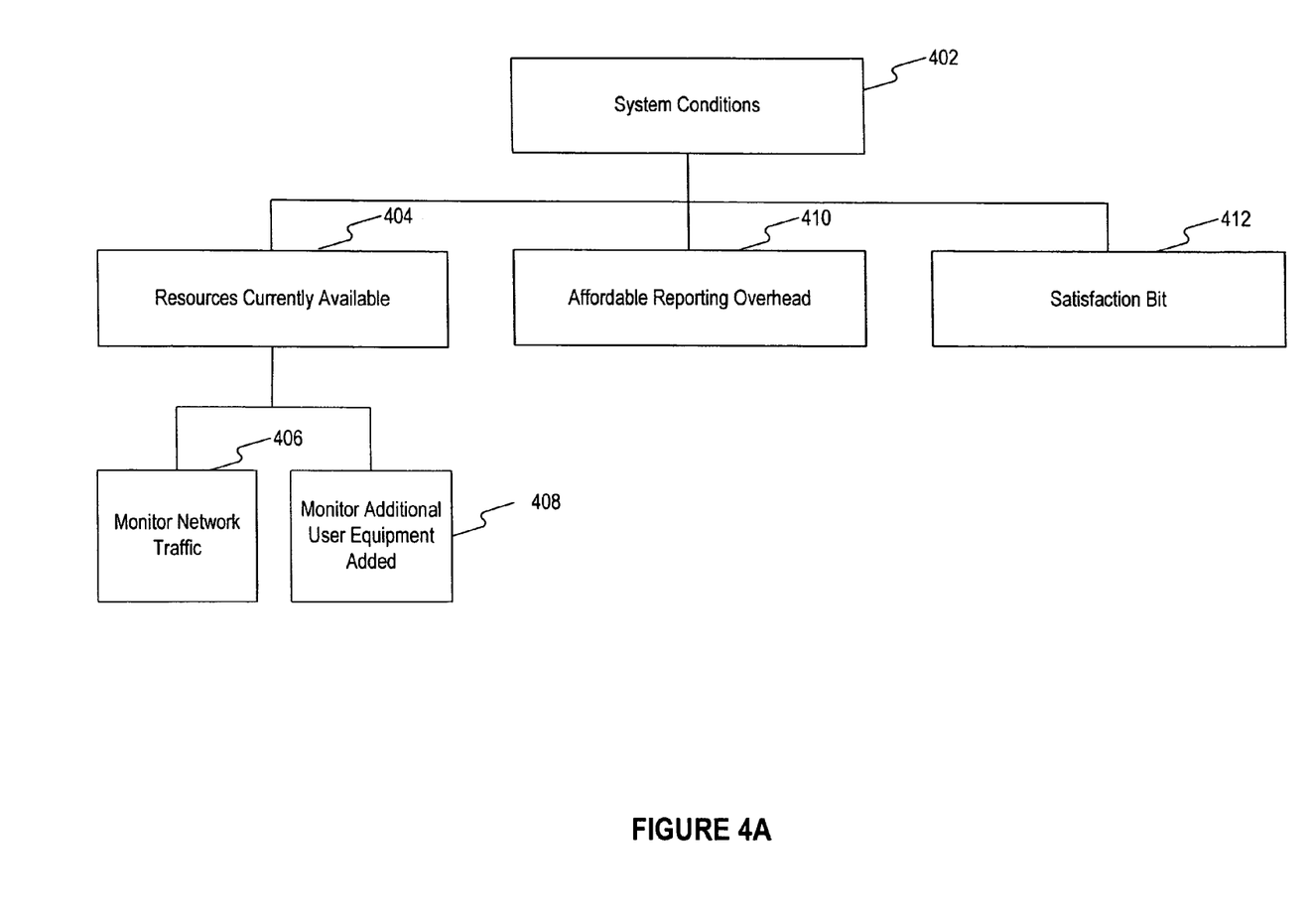
FIG. 4A is a diagram showing system conditions that a base station may use when determining a granularity level.

FIG. 4A is a diagram showing mobile communication system conditions 402 that a base station may use when determining granularity levels. The base station may use one or any combination of these system conditions in determining granularity levels.

A first category of system conditions 402 that the base station may use is the level of resources currently available

404. Currently available resources 404 include the amount of bandwidth available to the base station. If more bandwidth is available to the base station, then the value of the preferred granularity level can be larger since, as previously described, a higher granularity level corresponds to more overhead and bandwidth use. On the other hand, if less bandwidth is available to the base station, then the value of the preferred granularity level may need to be smaller. There are many ways in which the base station may determine the available bandwidth. In one example, the base station may monitor network traffic (resource 406), since an increase in network traffic may indicate a decrease in available bandwidth, and vice versa. That is, network traffic and available bandwidth are inversely related. Network traffic as used herein refers to the sum of requested bit rates by all mobile stations which are admitted by the base station to the network. For example, if the network traffic is below a certain threshold L1, then the base station may choose a relatively high granularity level, since more bandwidth is available. Conversely, if network traffic is above a certain threshold L2 (where L2>L1), the base station may choose a relatively low granularity level, since less bandwidth is available. If the network traffic is between thresholds L1 and L2, the base station may choose a relatively medium granularity level.

In another example, the base station may monitor additional UEs connected to or disconnected from the base station (resource 408), since added UEs that the base station has to support may result in a decrease in available bandwidth, and vice versa. In other words, the available bandwidth is inversely related to the number of UEs connected to a base station. Therefore, as UEs are disconnected from the base station, the base station may choose a higher granularity level, since more bandwidth would become available. Conversely, as each UE is connected to the base station, the base station may choose a lower granularity level, since less bandwidth would be available.

A second category of system conditions 402 that the base station may use is affordable reporting overheads 410. Affordable reporting overheads as used herein refer to the amount of resources that the base station specifically would like to allocate for reporting. This differs from currently available resources 404 because affordable reporting overheads 410 are independent of run time system conditions. Instead, the affordable reporting overheads 410 are based upon what the base station deems appropriate for reporting. For example, the affordable reporting overheads (410) can be specified by a network operator or defined by a standards organization.

A third category of system conditions 402 that the base station may use is a satisfaction bit 412 received by the base station from each UE. The satisfaction bit 412 expresses to the base station whether or not the UE is satisfied with the scheduling grant supplied by the base station. As previously described, the base station determines a scheduling grant to assign to the UE based in part on the buffer status report(s) that the UE sends to the base station. The scheduling grant is an allocation by the base station to the UE of uplink bandwidth resources. As also previously described, a base station is able to make a more accurate determination of an appropriate scheduling grant if the granularity of buffer status reports it receives is relatively high. Therefore, if the UE transmits a satisfaction bit 412 to the base station that indicates that it is not satisfied with the scheduling grant, the base station may increase the preferred granularity so that it receives a more detailed buffer status report and therefore has more information with which to make decisions regarding the scheduling grant.

Figure 4B:
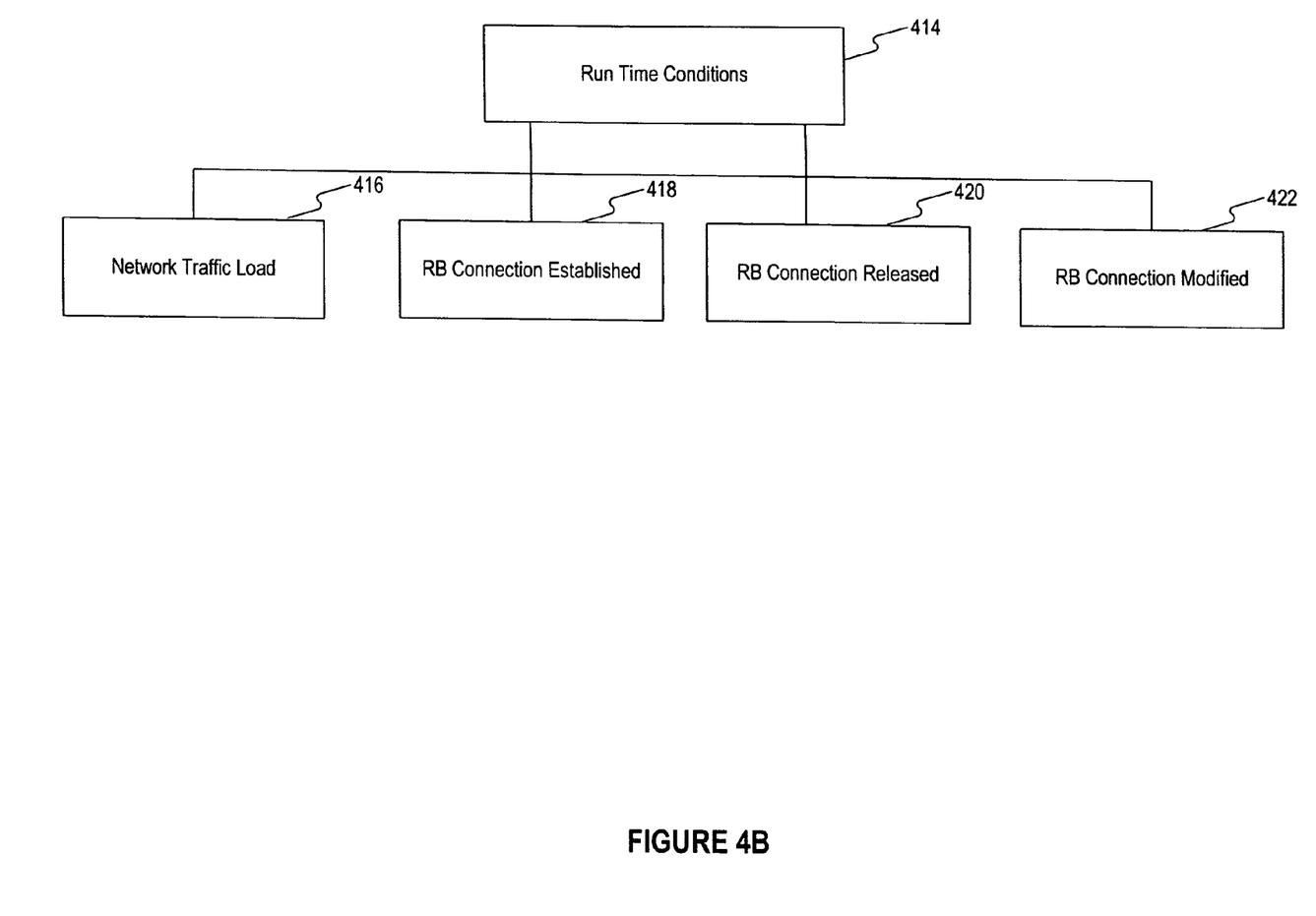
FIG. 4B is a diagram showing examples of run time conditions that a base station may use in determining when to send a granularity level.

FIG. 4B is a diagram showing mobile communication run time conditions 414 that a base station may consider in determining when to transmit a granularity level to the user equipment. The base station may consider one or any combination of these run time conditions in determining when to transmit the granularity level. Alternatively, the base station may send out granularity levels periodically or according to any other condition, run time or otherwise.

A first category of run time conditions 414 that the base station may consider is a change in the network traffic load 416. There are several ways in which the base station may determine whether or not a change in the network traffic load 416 is significant enough to trigger the sending of a granularity level to the user equipment. In one example, the base station sends a granularity level if the network traffic load exceeds a predetermined threshold. In another example, the base station sends the granularity level if the network traffic load increases by a predetermined amount over a predetermined time. In another example, the base station sends the granularity level if the network traffic load increases by a predetermined percentage over a predetermined time.

A second category of run time conditions 414 that the base station may consider is when a radio bearer (RB) connection is established 418 between a base station and a UE. As described above, RBs are logical connections, or communication ports, within the UE that may be classified according to the type of traffic they carry. The base station may need to update the granularity level when an RB connection is established 418, because the added connection may imply less available bandwidth. Consequently, the base station may adjust the granularity level to take into account the new network topology.

A third category of run time conditions 414 that the base station may consider is when an RB connection is released 420 between a base station and a UE. The base station may need to update the granularity level when an RB connection is released 420, because the released connection may imply more available bandwidth. Consequently, the base station may adjust the granularity level to take into account the new network topology.

A fourth category of run time conditions 414 that the base station may consider is when an RB connection is modified 422 between a base station and a UE. The base station may need to update the granularity level when an RB connection is modified 422, because the modified connection may imply more or less available bandwidth. Consequently, the base station may adjust the granularity level to take into account the new network topology. One example of a modified connection is when a bit rate of an RB is increased or decreased by the base station.

Figure 5A:
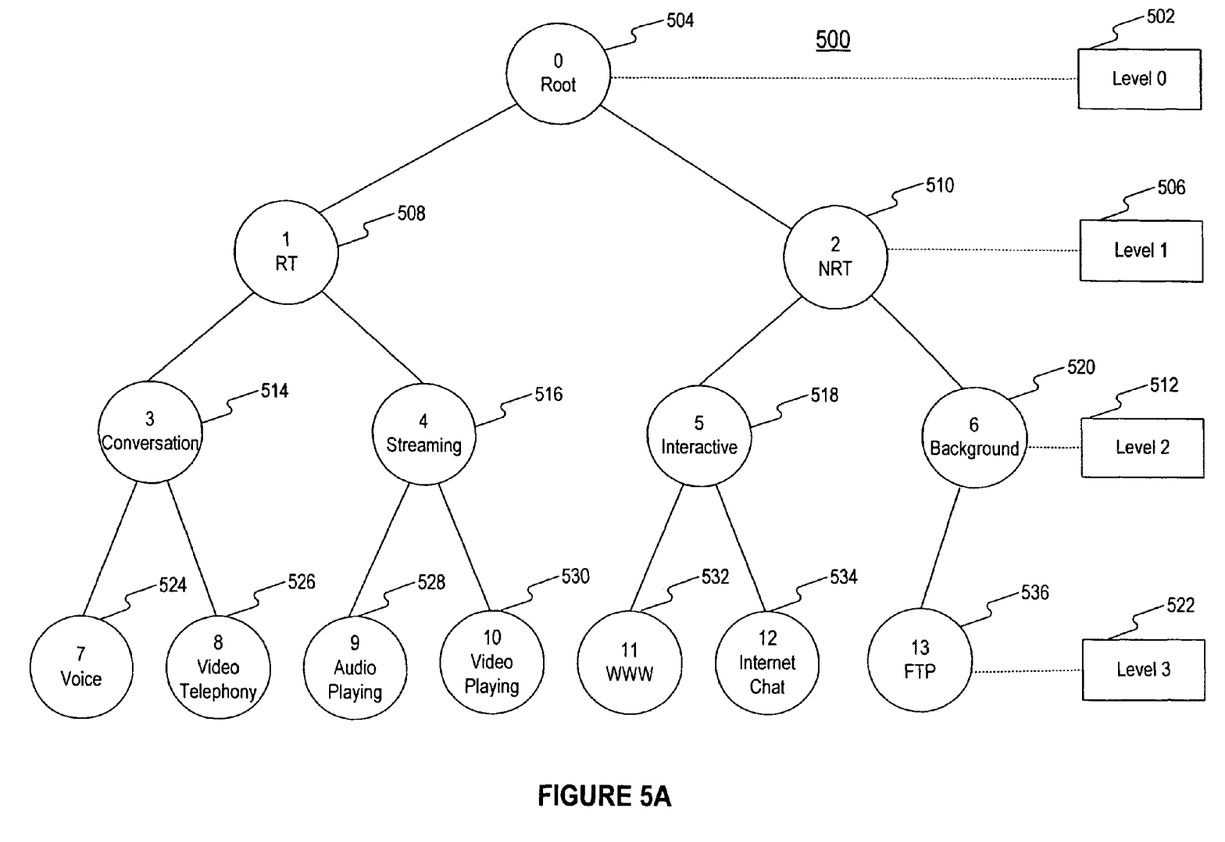
FIG. 5A is a diagram showing a tree in which radio bearers are grouped into levels, consistent with embodiments of the present invention.

FIG. 5A is a diagram showing a tree 500 in which radio bearers (RBs) of UEs may be grouped according to traffic type. Using tree 500, a base station can assign granularity levels based on RB groups.

Tree 500 is one example of a hierarchy of traffic types that may be specified for RBs for use by the base station in assigning granularity levels. As seen in FIG. 5A, the RBs are grouped into levels, more fully described below, based on their logical functions. There are several ways by which the UEs may be informed about the structure of tree 500. In one example, the structure of tree 500 can be predefined and stored in hardware on the UE. In another example, the structure of tree 500 can be sent to the UE when the UE first connects to the network. Level 0 (item 502) is the most general grouping, and consists of a single root node 504. In this example, if the base station specifies a granularity for level 0, the UE would provide a single buffer status report (corresponding to the single root node 504) that would summarize the buffer status for all RB buffers, e.g., the total amount of all buffer data for all RBs of the UE. This lowest level of granularity provides for the least overhead, but also the least amount of information regarding buffer information.

The next level, Level 1 (item 506), is a less general grouping than level 0 (item 502). Level 1 (item 506) differentiates two possible traffic types. These two traffic types are represented by a real time (RT) node 508 and a non real time node (NRT) 510, which refer to the type of data transfer handled by the RBs. Therefore, if the base station specifies a granularity level of 1, the UE would provide a buffer status report that would separately summarize the buffer status for RBs that carry real time data, and the buffer status for RBs that carry non real time data. Alternatively, the UE could provide two separate buffer status reports that respectively summarize the buffer status for RBs that carry real time data and non real time data.

The next level, Level 2 (item 512) is a more specific grouping than Level 1 (item 506). Level 2 subdivides RT node 508 into a conversation node 514 and a streaming node 516. Level 2 also subdivides NRT node 510 into an interactive node 518 and a background node 520. Therefore, if the base station specifies a granularity level of 2, the UE would provide a buffer status report (corresponding to nodes 514, 516, 518, and 520) that would separately summarize the buffer status for RBs that carry conversation data, for RBs that carry streaming data, for RBs that carry interactive data, and for RBs that carry background data. Alternatively, the UE could provide four separate buffer status reports that respectively summarize the buffer status for RBs that carry conversation data, streaming data, interactive data, and background data.

The last level, Level 3 (item 522), is the most specific grouping and has a node for each RB in the UE. Level 3 subdivides conversation 514 into voice 524 and video telephony 526, subdivides streaming 516 into audio playing 528 and video playing 530, subdivides interactive 518 into WWW 532 and Internet Chat 534, and background 520 into File Transfer Protocol (FTP) 536. Therefore, nodes 524, 526, 528, 530, 532, 534, and 536 may each correspond to a specific RB. If the base station specifies a granularity level of 3, the UE would provide a buffer status report that summarizes the buffer status for each RB in the UE. Alternatively, the UE could provide seven separate buffer status reports that respectively summarize the buffer status for RBs that carry voice data, video telephony data, audio playing data, video playing data, WWW data, Internet Chat data, and FTP data. Thus, this highest level of granularity results in the greatest overhead, but also provides the most information to the base station.

Further with respect to FIG. 5A, when sending granularity levels to the UE, the base station may assign a plurality of different granularity levels to the same UE. In one example, the base station may assign a Level 3 granularity level for RT 508 traffic (i.e., Voice 524, Video Telephony 526, Audio Playing 528, and Video Playing 530 are reported) and a Level 2 granularity level for NRT 510 traffic (i.e., Interactive 518 and Background 520 are reported). In another example, the base station may assign a Level 3 granularity level for Conversation 514 traffic (i.e., Voice 524 and Video Telephony 526 are reported), a Level 2 granularity level for Streaming 516 traffic (i.e., Streaming 516 is reported), and a Level 1 granularity level for NRT 510 traffic (i.e. NRT 510 is reported). This feature gives the base station significant control over the buffer status reports.

Figure 5B:
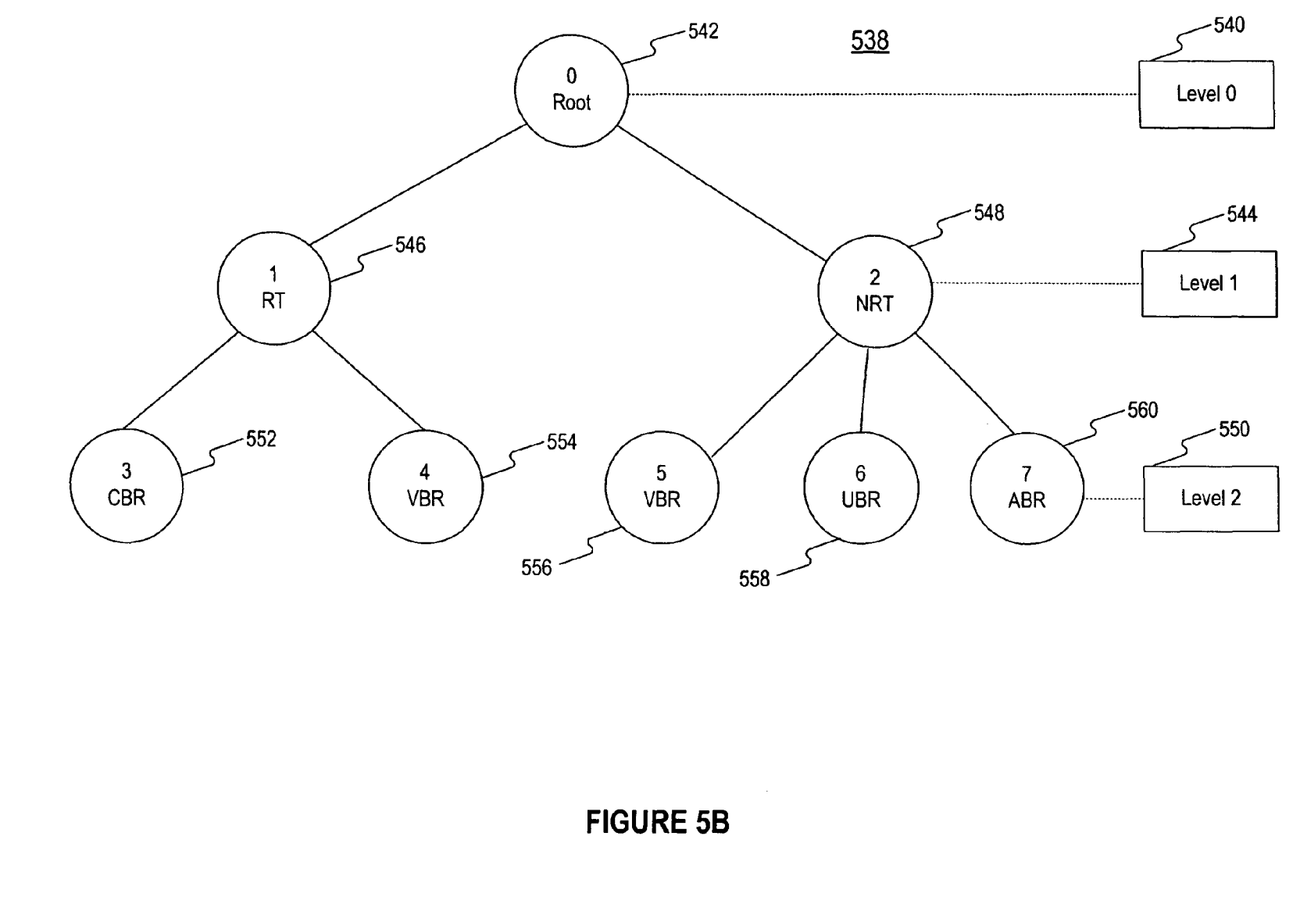
FIG. 5B is a diagram showing a tree in which radio bearers are grouped into a different set of groupings than those of FIG. 5A.

FIG. 5B is a diagram showing tree 538 that illustrates an example of another set of groupings of radio bearers. Level 0 (540) consists of a single root node 542. Level 1 (544) sub- divides the single root node 542 into a real time node 546 and a non real time node 548. Level 2 (550) subdivides real time node 546 into a constant bit rate node 552 and a real time variable bit rate node 554 and subdivides non real time node 548 into a non real time variable bit rate node 556, an unspecified bit rate group 558, and an available bit rate group 560.

The groupings and levels indicated in FIGS. 5A and 5B are illustrative only, and those skilled in the art will now appreciate that greater or fewer numbers of levels may be implemented, and that groupings may be differently assigned. Each variation is contemplated within embodiments of the present invention.

Figure 6:
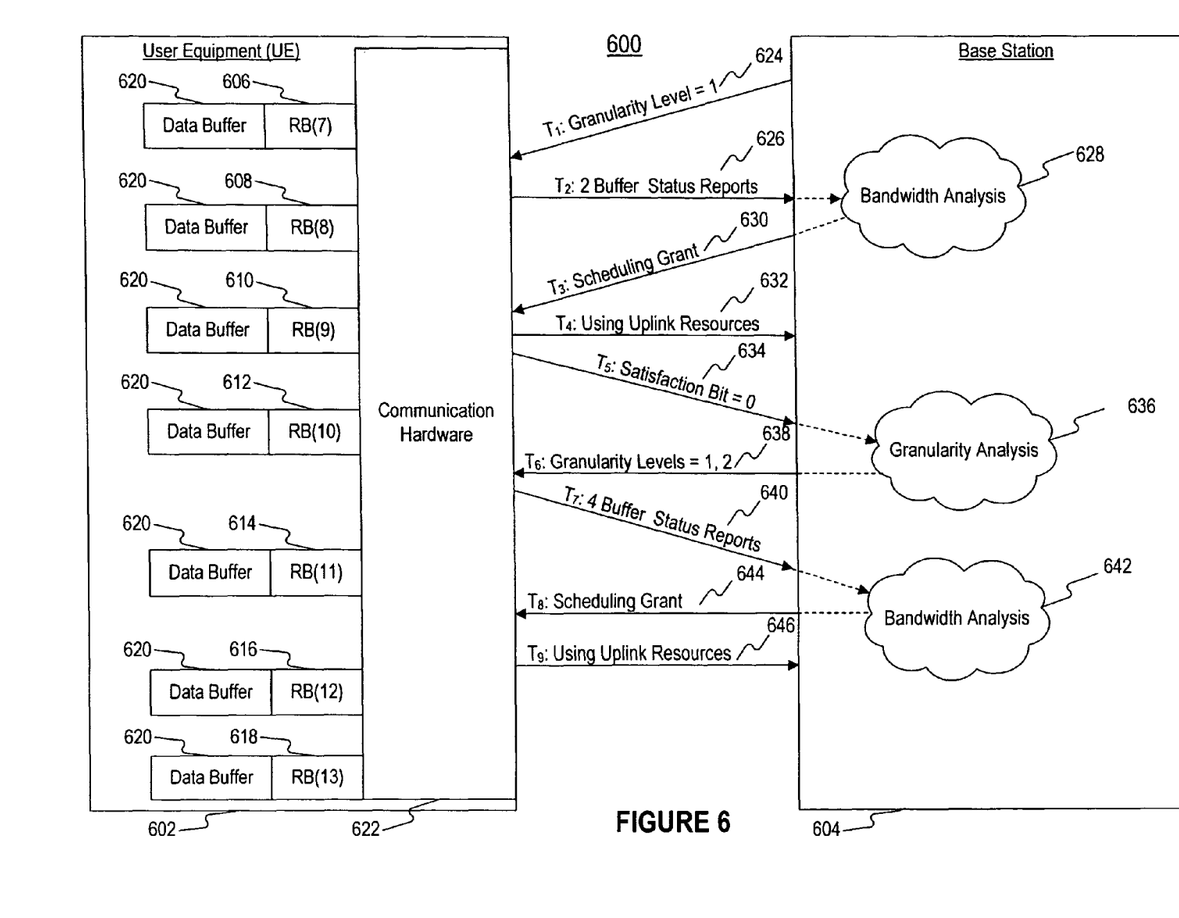
FIG. 6 is a diagram illustrating an example of interaction between user equipment and a base station consistent with embodiments of the present invention.

FIG. 6 illustrates an example of interaction between user equipment and a base station consistent with embodiments of the present invention. In a mobile communication system 600, a UE 602 and a base station 604 communicate to provide mobile service. UE 602 includes RB(7) 606, RB(8) 608, RB(9) 610, RB(10) 612, RB(11) 614, RB(12) 616, and RB(13) 618 associated with specific types of network traffic, with the number in parenthesis corresponding to the node in FIG. 5A that represents that type of network traffic. For example, RB(7) 606 carries voice traffic, which is node 7 in FIG. 5A. As a further example, RB(8) 608 carries video telephony traffic, which is node 8 in FIG. 5A. Each RB 606, 608, 610, 612, 614, 616, and 618 has its own data buffer 620 associated with it. UE 602 communicates with base station 604 through communication hardware 622.

In this example, UE 602 and base station 604 communicate through a series of interaction steps shown as arrows between them. Each interaction step is labeled with a time period $T_n$, $T_{n+1}$, etc., (n=1, 2, . . . , 9) where $T_{n+1}$ is later in time than $T_n$.

At time $T_1$, base station 604 sends a granularity level of 1 to UE 602 (step 624). UE 602 accesses its granularity tree at Level 1, where, as shown in FIG. 5A, there are two nodes (RT and NRT) representing data classifications. UE 602 then classifies the RBs into these two nodes accordingly. According to tree 500 in FIG. 5A, RBs 606, 608, 610, and 612 are classified as RT, while RBs 614, 616, and 618 are classified at NRT. UE 602 then consolidates the buffer status information (e.g.: how much data is in the respective data buffers 620) separately for the data buffers 620 associated with RBs classified as RT and for the data buffers 620 associated with RBs classified as NRT. Then at time $T_2$, UE 602 sends the buffer status information to base station 604 (step 626). This buffer status information may be sent as a single buffer status report containing the separate buffer status information for RT and NRT RBs, or as two separate buffer status reports respectively containing the buffer status information for the RT and NRT buffers. Base station 604 then uses this buffer status information, in addition to other system conditions and requirements, to perform a bandwidth analysis 628. Through the bandwidth analysis 628, the base station 604 determines an appropriate scheduling grant to assign to UE 602. At time $T_3$, base station 604 sends the scheduling grant to UE 604 (step 630). At time $T_4$, UE 602 uses uplink resources consistent with the scheduling grant it received from base station 604 (step 632).

Later, at time $T_5$, UE 602 sends a satisfaction bit of 0 to base station 604, indicating that UE was not satisfied with the scheduling grant (step 634). One of ordinary skill in the art will now appreciate that a satisfaction bit value of either 1 or 0 may denote dissatisfaction, or that a number of bits would enable the UE to express a range of satisfaction. Base station 604 then performs a granularity analysis 636 in order to determine the next granularity level to send to UE 602. In the granularity analysis 636, base station 604 may use any one or a combination of system conditions, including the satisfaction bit, affordable reporting overhead, and resources currently available. In the current example, base station 604 considers the indication from UE 602 that it was not satisfied with the previous scheduling grant. To remedy this, base station 604 increases the granularity level to Level 2 for real-time traffic, from the previously transmitted level of Level 1 and maintains the Level 1 granularity level for non real-time traffic (step 624), so that base station 604 will now receive more buffer status information from UE 602. At time $T_6$, base station 604 sends the granularity levels of Level 1 for real-time traffic and Level 2 for non real-time traffic to UE 602 (step 638). UE 602, upon receipt of the new granularity levels, classifies the RBs into three types, i.e., conversation, streaming, and non real-time, as previously defined with respect to tree 500 in FIG. 5A. According to tree 500 in FIG. 5A, at Level 2, RBs 606 and 608 are classified as conversation, RBs 610 and 612 are classified as streaming, and RBs 614, 616, and 618 are classified as non real-time. UE 602 then consolidates the buffer status information i.e., how much data is in the data buffers 620, for the data buffers 620 associated with each classification of RB. Then at time $T_7$, UE 602 sends the buffer status information separately consolidated for each of the three classifications, to base station 604 (step 640). Base station 604 then uses this buffer status information, in addition to other system conditions and requirements, to perform another bandwidth analysis 642. Through bandwidth analysis 642, base station 604 determines an appropriate scheduling grant to assign to UE 602. At time $T_8$, base station 604 sends the scheduling grant to UE 602 (step 642). At time $T_9$, UE 602 uses uplink resources consistent with the scheduling grant it received from base station 604 (step 646).

User equipment or base station may include one or more of the following components: at least one central processing unit (CPU) configured to execute computer program instructions to perform various processes and methods, random access memory (RAM) and read only memory (ROM) configured to access and store information and computer program instructions, memory to store data and information, one or more databases to store tables, lists, or other data structures, one or more I/O devices, one or more interfaces, one or more antennas, etc. Each of these components is well-known in the art.

Those skilled in the art will now appreciate that all or part of systems and methods consistent with the present invention may be stored on or read from other computer-readable media, such as: secondary storage devices, like hard disks, floppy disks, CD, or DVD; a carrier wave received from the Internet; or other forms of computer-readable memory, such as read-only memory (ROM) or random-access memory (RAM).

Furthermore, one skilled in the art will now also recognize that the processes illustrated in this description may be implemented in a variety of ways and include multiple other modules, programs, applications, scripts, processes, threads, or code sections that all functionally interrelate with each other to accomplish the individual tasks described above for each module, script, and daemon. For example, it is contemplated that these programs modules may be implemented using commercially available software tools, using custom object-oriented, using applets written in the Java programming language, or may be implemented as with discrete electrical components or as at least one hardwired application specific integrated circuits (ASIC) custom designed just for this purpose.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A method for controlling communication overhead from a user equipment to a base station, the user equipment including buffers, each of the buffers having a buffer status, the method comprising:

determining, at the base station, a granularity level indicating a grouping of the buffers in the user equipment, the base station determining the granularity level based at least in part on an affordability of reporting overheads related to resources allocated by the base station;

sending the determined granularity level to the user equipment; and receiving, from the user equipment, a buffer status report in accordance with the grouping.

2. The method of claim 1 wherein the determining includes determining the granularity level based at least in part on availability of radio resources.

3. The method of claim 2 wherein the base station determines the availability of radio resources by monitoring network traffic.

4. The method of claim 2 wherein the base station determines the availability of radio resources by monitoring addition and subtraction of user equipment accessing the base station.

5. The method of claim 1 further including:

receiving, from the user equipment, information that represents a level of satisfaction with a current allocation of uplink bandwidth resources, wherein the determining includes determining the granularity level based at least in part on the received satisfaction information.

6. The method of claim 1 wherein there are a plurality of the user equipment, wherein:

the determining further includes determining, at the base station, a granularity level specific to each of the plurality of user equipment;

the sending of the determined granularity further includes sending to each of the plurality of user equipment the specific granularity level determined therefor; and the receiving a buffer status report further includes receiving from each of the plurality of user equipment, the buffer status report in accordance with the specific granularity level determined therefor.

7. The method of claim 1 wherein there are a plurality of the user equipment, individual ones of the user equipment belonging to one of a plurality of groups including a first group and a second group, wherein:

the determining further includes determining a first granularity level for the user equipment belonging to the first group and a second granularity level for the user equipment belonging to the second group;

the sending of the determined granularity further includes sending to the user equipment belonging to the first group the first granularity level and sending to the user equipment belonging to the second group the second granularity level; and the receiving a buffer status report further includes receiving from each of the user equipment belonging to the first group a first buffer status report in accordance with the first granularity level and receiving from each of the user equipment belonging to the second group a second buffer status report in accordance with the second granularity level.

8. A method for controlling communication overhead from at least one user equipment to a base station, the at least one user equipment including radio bearers and buffers there being a buffer status for each of the radio bearers of the at least one user equipment, the method comprising:
grouping the radio bearers into a hierarchy of groups wherein each of the radio bearers is separate in a lowest level of the hierarchy and the radio bearers are grouped into at least one group in a higher level of the hierarchy;
determining, at the base station, a granularity level of an amount of information about the buffer statuses of the radio bearers, the granularity level being either (i) for the lowest level to thereby require the buffer status of each of the radio bearers or (ii) for the higher level to thereby require a summary of the buffer statuses of the radio bearers in each of the at least one group.

9. The method of claim 8, wherein the lowest level is a third level, the method further comprising:
grouping the radio bearers into a first set of groups at a first level of the hierarchy;
grouping the radio bearers into a second set of groups at a second level of the hierarchy, wherein each group from the second set of groups is a subset of one group from the first set of groups,
wherein the determining further comprises determining one of:
the granularity level as an amount of information about the buffer status of each of the radio bearers of the third level,
the granularity level as summaries of the buffer status information of each group from the second set of groups, and
the granularity level as summaries of the buffer status information of each group from the first set of groups.

10. The method of claim 9, wherein the first set of groups comprises a root node.

11. The method of claim 9, wherein the first set of groups comprises a real-time group and a non real-time group.

12. The method of claim 11, wherein the second set of groups comprises a constant bit rate group and a real-time variable bit rate group that correspond to the real-time group, and a non real-time variable bit rate group, an unspecified bit rate group, and an available bit rate group that correspond to the non real-time group.

13. The method of claim 11, wherein the second set of groups comprises a conversation group and a streaming group that correspond to the real-time group, and an interactive group and a background group that correspond to a non real-time group.

14. The method of claim 9, wherein the second set of groups comprises a constant bit rate group, a real-time variable bit rate group, a non real-time variable bit rate group, an unspecified bit rate group, and an available bit rate group.

15. The method of claim 9, wherein the second set of groups comprises a conversation group, a streaming group, an interactive group, and a background group.

16. A mobile communication system for managing network traffic, the system comprising:
a user equipment including buffers, each of the buffers having a buffer status;
a base station configured to:
determine a granularity level indicating a grouping of the buffers in the user equipment, the base station determining the granularity level based on at least an availability of radio resources to the base station;
send the determined granularity level to the user equipment; and
receive, from the user equipment a buffer status report in accordance with the determined granularity level.

17. The mobile communication system of claim 16 wherein the base station is configured to broadcast the determined granularity level to a plurality of the user equipment.

18. The mobile communication system of claim 16 wherein the base station is configured to determine a plurality of granularity levels and send the plurality of granularity levels to the user equipment.

19. The mobile communication system of claim 18 wherein the base station is configured to receive the buffer status report in accordance with the plurality of granularity levels.

20. The mobile communication system of claim 16 wherein the base station is configured to send the determined granularity level to the user equipment when there is a change in the network traffic.

21. The mobile communication system of claim 16 wherein the base station is configured to send the determined granularity level to the user equipment when the base station establishes a connection with one of a plurality of the user equipment.

22. The mobile communication system of claim 16 further including a plurality of the user equipment;
wherein the base station is configured to send the determined granularity level to at least one of the plurality of user equipment when the base station releases a connection with another one of the plurality of user equipment.

23. The mobile communication system of claim 16 further including a plurality of the user equipment;
wherein the base station is configured to send the determined granularity level to at least one of the plurality of user equipment when the base station modifies a connection with another one of the plurality of user equipment.

* * * * *